US011023968B2

(12) United States Patent
Arnold et al.

(10) Patent No.: US 11,023,968 B2
(45) Date of Patent: Jun. 1, 2021

(54) SYSTEMS AND METHODS FOR UPDATING A DISTRIBUTED LEDGER BASED ON PARTIAL VALIDATIONS OF TRANSACTIONS

(71) Applicant: Goldman, Sachs & Co., New York, NY (US)

(72) Inventors: Matthew Timothy Arnold, Lower Heyford (GB); Zartasha Naeem, London (GB)

(73) Assignee: Goldman Sachs & Co. LLC, New York, NY (US)

( * ) Notice: Subject to any disclaimer, the term of this patent is extended or adjusted under 35 U.S.C. 154(b) by 442 days.

(21) Appl. No.: 14/639,895

(22) Filed: Mar. 5, 2015

(65) Prior Publication Data

US 2016/0260169 A1   Sep. 8, 2016

(51) Int. Cl.
*G06Q 40/04* (2012.01)
*G06Q 20/02* (2012.01)
(Continued)

(52) U.S. Cl.
CPC .......... *G06Q 40/04* (2013.01); *G06Q 20/023* (2013.01); *G06Q 20/381* (2013.01);
(Continued)

(58) Field of Classification Search
CPC .............. G06Q 20/389; G06Q 20/401; G06Q 2220/00; G06Q 40/06; G06Q 20/06; G06Q 20/065; G06Q 20/3674; G06Q 20/3678; G06Q 20/381; G06Q 20/3825; G06Q 40/12; G06Q 20/023; G06Q 20/0655; G06Q 20/223; G06Q 20/36; G06Q 20/363; G06Q 20/3827; G06Q 40/04; G06Q 40/128;
(Continued)

(56) References Cited

U.S. PATENT DOCUMENTS 5,262,942 A * 11/1993 Earle ...................... G06Q 40/00
705/35
5,970,479 A * 10/1999 Shepherd ............... G06Q 40/02
705/37

(Continued)

FOREIGN PATENT DOCUMENTS

CN   101523428 A   9/2009
JP   2013-033408 A   2/2013

OTHER PUBLICATIONS

Markus K. Brunnermeier and Lasse H. Pedersen, Predatory Trading, The Journal of Finance, vol. LX, No. 4, pp. 1825-1863, Aug. 2005.

(Continued)

*Primary Examiner* — Slade E Smith

(57) ABSTRACT

The systems and methods described herein relate to processing financial transactions using a computer network that stores a distributed ledger, and particularly, to updating the distributed ledger based on data messages received from validation servers that each store a portion of the ledger corresponding to a respective asset. The systems and methods described herein employ the distributed ledger to control visibility of transactions to the general marketplace, but still provide swift and assured completion of transactions and visibility and audit capability for regulators.

20 Claims, 6 Drawing Sheets

(51) Int. Cl.
*G06Q 40/00* (2012.01)
*G06Q 20/38* (2012.01)
*G06Q 20/40* (2012.01)

(52) U.S. Cl.
CPC ....... *G06Q 20/3829* (2013.01); *G06Q 20/401* (2013.01); *G06Q 40/12* (2013.12); *G06Q 40/128* (2013.12); *G06Q 2220/00* (2013.01)

(58) Field of Classification Search
CPC . G06Q 20/3829; H04L 67/104; H04L 9/3247; H04L 2209/56; H04L 63/0428; H04L 63/062; H04L 63/10; H04L 9/0637; H04L 9/0861; H04L 9/14; H04L 9/30; H04L 9/3255; G06F 21/602; G06F 21/6218
USPC .......................................................... 705/37
See application file for complete search history.

(56) References Cited

U.S. PATENT DOCUMENTS

| | | | | |
|---|---|---|---|---|
| 6,725,202 B1* | 4/2004 | Hurta | ................... | G06Q 20/363 705/13 |
| 7,314,168 B1* | 1/2008 | Gorres | ................... | G06Q 40/00 235/380 |
| 7,328,188 B1* | 2/2008 | Barry | .................... | G06Q 20/10 705/40 |
| 8,886,570 B1* | 11/2014 | Amancherla | .......... | G06Q 20/36 705/67 |
| 9,147,188 B2* | 9/2015 | Dharmapalan | ... | H04W 12/0608 |
| 9,411,982 B1* | 8/2016 | Dippenaar | .......... | G06F 21/6218 |
| 2002/0065919 A1* | 5/2002 | Taylor | ..................... | G06F 16/27 709/226 |
| 2002/0073015 A1* | 6/2002 | Chan | ..................... | G06Q 40/04 705/37 |
| 2002/0156726 A1* | 10/2002 | Kleckner | ............... | G06Q 20/10 705/39 |
| 2003/0070080 A1* | 4/2003 | Rosen | ................... | G06Q 20/06 713/187 |
| 2003/0225683 A1* | 12/2003 | Hill | ........................ | G06Q 40/04 705/37 |
| 2004/0138973 A1* | 7/2004 | Keis | ....................... | G06Q 20/04 705/35 |
| 2004/0143539 A1* | 7/2004 | Penney | .................. | G06Q 40/06 705/37 |
| 2005/0131836 A1* | 6/2005 | Armstrong | ........... | G06Q 20/382 705/64 |
| 2005/0137961 A1* | 6/2005 | Brann | .................... | G06Q 40/04 705/37 |
| 2006/0213980 A1* | 9/2006 | Geller | .................... | G06Q 20/10 235/380 |
| 2008/0082452 A1* | 4/2008 | Wankmueller | ... | G06Q 20/40145 705/67 |
| 2008/0113776 A1* | 5/2008 | Sommer | ............. | G07F 17/3248 463/25 |
| 2008/0281907 A1* | 11/2008 | Vieira | .................... | G06Q 40/06 709/203 |
| 2009/0121015 A1* | 5/2009 | Newmark | ............ | G06Q 20/387 235/381 |
| 2009/0182672 A1* | 7/2009 | Doyle | ..................... | G06F 21/64 705/64 |
| 2009/0313165 A1 | 12/2009 | Walter | | |
| 2011/0153434 A1* | 6/2011 | Thomas | ............. | G06Q 30/0276 705/14.72 |
| 2012/0041871 A1* | 2/2012 | Sell | ........................ | G06Q 20/10 705/39 |
| 2012/0047052 A1* | 2/2012 | Patel | ..................... | G06Q 40/00 705/30 |
| 2012/0078785 A1* | 3/2012 | Anthony | .............. | G06Q 20/108 705/42 |
| 2012/0095885 A1* | 4/2012 | Seay | ....................... | G06Q 20/40 705/30 |
| 2012/0323654 A1* | 12/2012 | Writer | .................... | G06Q 30/02 705/14.16 |
| 2013/0030941 A1* | 1/2013 | Meredith | ............... | G06Q 30/06 705/26.3 |
| 2013/0036476 A1* | 2/2013 | Roever | ................. | G06F 21/335 726/27 |
| 2013/0125114 A1* | 5/2013 | Frascadore | ............. | G06F 21/30 718/1 |
| 2013/0179337 A1* | 7/2013 | Ochynski | ............. | G06Q 20/065 705/40 |
| 2013/0198863 A1* | 8/2013 | Wallin | .................... | G06F 21/10 726/28 |
| 2013/0204785 A1* | 8/2013 | Monk | ................... | G06Q 20/322 705/44 |
| 2013/0229452 A1* | 9/2013 | Roof | .......................... | B41J 3/32 347/9 |
| 2013/0268438 A1* | 10/2013 | Boyle | .................. | G06Q 20/381 705/44 |
| 2013/0282580 A1* | 10/2013 | O'Brien | ............... | G06Q 50/265 705/44 |
| 2013/0346309 A1* | 12/2013 | Giori | ....................... | G06Q 20/10 705/43 |
| 2014/0025521 A1* | 1/2014 | Alsina | ................ | G06Q 30/0601 705/26.1 |
| 2014/0222671 A1* | 8/2014 | Elias | ..................... | G06Q 40/02 705/42 |
| 2014/0279451 A1* | 9/2014 | Saadat | ................ | G06Q 20/02 705/40 |
| 2014/0279680 A1* | 9/2014 | Conley | .................. | G06Q 40/06 705/36 R |
| 2014/0330721 A1* | 11/2014 | Wang | ................... | G06Q 40/04 705/44 |
| 2014/0337206 A1* | 11/2014 | Talker | ................ | G06Q 20/0658 705/41 |
| 2015/0026072 A1* | 1/2015 | Zhou | ....................... | G06Q 20/20 705/71 |
| 2015/0063625 A1* | 3/2015 | Martin | ................ | H04N 1/32352 382/100 |
| 2015/0066748 A1* | 3/2015 | Winslow | ................. | G06Q 20/10 705/39 |
| 2015/0067344 A1* | 3/2015 | Poder | .................... | G06F 21/316 713/176 |
| 2015/0074764 A1* | 3/2015 | Stern | ........................ | H04L 63/06 726/4 |
| 2015/0095225 A1* | 4/2015 | Appana | ............. | G06Q 20/3674 705/41 |
| 2015/0106620 A1* | 4/2015 | Cabrera | .................. | G06F 9/455 713/168 |
| 2015/0170112 A1* | 6/2015 | DeCastro | ............. | G06Q 20/381 705/39 |
| 2015/0220928 A1* | 8/2015 | Allen | .................. | G06Q 20/3829 705/67 |
| 2015/0262173 A1* | 9/2015 | Durbin | ............ | G06Q 20/38215 705/64 |
| 2015/0269539 A1* | 9/2015 | MacGregor | ............ | G06Q 20/10 705/39 |
| 2015/0312233 A1* | 10/2015 | Graham, III | ............ | H04L 63/08 713/171 |
| 2015/0339886 A1* | 11/2015 | Pinkus | ................ | G07F 17/3218 463/25 |
| 2015/0363876 A1* | 12/2015 | Ronca | .................. | G06Q 40/04 705/37 |

OTHER PUBLICATIONS

El Defrawy, et al., Founding Digital Currency on Secure Computation, Computer and Communications Security, ACM, Nov. 3, 2014 (Nov. 3, 2014).
International Search Report and Written Opinion dated May 2, 2016 for International Application No. PCT/US2016/021069, International Filing Date Mar. 4, 2016.
Foreign Communication from Related Counterpart Application; PCT Application No. PCT/US2016/021069; Preliminary Report on Patentability dated Sep. 14, 2017; 7 pages.
European Patent Office, "Communication pursuant to Article 94(3) EPC," Application No. EP16710594.9, dated Feb. 8, 2019, 6 pages.

(56) References Cited

OTHER PUBLICATIONS

Notice of Reason(s) for Rejection in connection with counterpart Japanese Patent Application No. 2017-564775 dated Dec. 3, 2019, 8 pages.
Office Action dated Feb. 3, 2016 in connection with Chinese Patent Application No. 201680025792.5, 29 pages.

* cited by examiner

SYSTEMS AND METHODS FOR UPDATING A DISTRIBUTED LEDGER BASED ON PARTIAL VALIDATIONS OF TRANSACTIONS

BACKGROUND

The processing of financial transactions, in particular on the foreign exchange market, can involve substantial settlement risk because such transactions generally comprise two parts. For example, a transaction in which a first party buys a certain amount of U.S. dollars from a second party in exchange for Euros may be processed in two parts, namely (i) the transfer of Euros from the first to the second party, and (ii) the transfer of U.S. dollars from the second to the first party. In the absence of a trusted third party, the two parts of such foreign exchange transactions are processed at different times due to varying processing times, time zone differences, or other factors. Until both parts of the transaction are completed, a party that has completed its part of the transaction but not yet received funds from the other party is subject to risk, because the other party may default on its obligation. This risk is known as "Herstatt" risk.

To mitigate the Herstatt risk associated with foreign exchange transactions, transactions may be settled by a trusted third party (e.g., CLS). The trusted third party accepts transactions from its member institutions (e.g., commercial banks), temporarily holds the funds of one party until the other party has also provided its funds, and then processes all parts of the transaction together. The trusted third party thus ensures that a transaction is either processed in its entirety or not at all. Further, the trusted third party can guarantee that funds are reserved for a specific transaction and cannot be used in unrelated transactions. This "all-or-nothing" approach of processing a transaction is known as "atomic settlement" or "payment-vs-payment." However, the use of a trusted third party does not necessarily establish a predetermined order in which transactions settle over the course of a given business day. In the FX market, current practice is that transactions scheduled for a specific day may settle at any time during the course of that day, which requires parties to maintain sufficient funds to ensure that, regardless of the order in which transactions are processed, funds will be available. The need to budget for a worse-case scenario can require that large amounts of funds be set aside to meet this so-called intraday liquidity requirement.

Intraday liquidity requirements can be reduced by processing transactions in near-real-time, such that transactions settle before new transactions are initiated. In conventional banking systems this is difficult, if not impossible, to realize, because payments need to move through multiple private ledgers and thus incur delay. Cryptographic currencies, such as Bitcoin or Ripple, maintain transaction records in a single ledger for all participants and thus are able to process transactions in order and fast compared to conventional banking systems. For example, Ripple typically processes transactions in a matter of a few seconds and Bitcoin in a matter of a few hours. However, these systems suffer from significant disadvantages in terms of privacy, because they maintain balances and transaction records in publicly accessible ledgers that are stored on distributed servers. This transparency helps maintain the accuracy of records by allowing many parties to observe and approve changes applied to the ledger. For example, while a single malicious actor may be able to falsify records on a few servers, wide dissemination of the publicly available ledger may prevent such a malicious actor from altering sufficient copies of the ledger. Although wide distribution of the ledger may be desirable for record accuracy, this public availability is contrary to the desire of wholesale market participants to support controlled visibility as it can reduce the willingness of parties to supply liquidity. For example, the cost associated with providing liquidity may increase for market makers, because transactions are fully visible and this allows other parties to change their behavior before the market makers have hedged the risk associated with the transaction. In practice this means the market will move against the market maker as soon as the transaction is published. Because both the customer and the market maker know this, then expected additional cost is passed from the market-maker to the customer. For this reason neither buyer nor seller in a large transaction has an interest in immediate publication. Most regulated securities exchanges have rules which allow for delayed publication of at least some trades. The practice of moving against the market maker is known as predatory trading and is discussed in detail in the journal article "Predatory Trading," authored by Markus K. Brunnermeier and Lasse H. Pedersen, published in "The Journal of Finance," vol. LX, No. 4 in August 2005, which is hereby incorporated by reference herein in its entirety.

While crypto-ledger systems such as Bitcoin and Ripple may obfuscate the identity of a specific party by using arbitrary account numbers that are not easy to attribute to a specific real-world party, large financial institutions (e.g., central banks) cannot rely on such obfuscation alone because the sheer size and volume of their transactions may reveal their identity to the general marketplace. Moreover, existing cryptographic transaction systems, such as Bitcoin or Ripple, lack designed-in identity checks that aid regulators with policing anti-money laundering (AML).

As such, there is a need for new systems and methods that can process transactions as swiftly as Bitcoin or Ripple without sacrificing the privacy of the parties involved.

SUMMARY

The disclosed systems and methods are generally directed to a distributed computer network that includes a plurality of servers for maintaining and updating copies of a distributed ledger based on cryptographic authentication techniques. More particularly, the systems and methods track exchanges, such as currency exchanges, or other types of exchanges, that take place in substantially real time. To that end, the system authorizes an individual and associates with the individual an account that represents some amount of an asset (for example a regulated currency). The system performs a payment in a single asset or exchanges two or more assets in substantially real time between two or more authorized individuals by adjusting account balances maintained within redundant copies of a distributed ledger. Further, the system arranges for the exchange in a private and secure form to prevent third parties from observing the exchange (or adjusting the ledger balance) before or during the exchange process.

The systems and methods described herein include a ledger administration server that controls a ledger to allow a payment or foreign currency exchange transaction to occur in real-time or substantially real-time. The system creates a data table that records verified accountholders and the balance of each asset held by that respective accountholder. The system further records asset issuing authorities. Each asset issuing authority is an authority (or a proxy for that authority) that controls the supply of a particular asset held by one or more of the accountholders. The system includes a validation process that provides each asset issuing authority with view/approval access to the account of each accountholder, but restricts that access to a portion of that account that records balances in the asset issued by that issuing authority.

The system stores redundant copies of the data tables, which include account information and account balances, at the ledger administration server and at asset validation servers associated with the asset issuing authorities. The distributed storage of the data tables provides additional protection from attempts to falsify information stored in the data tables of the ledger because more than one server would need to be compromised. The system uses authentication techniques to verify identifying information and perform know-your-customer (KYC) or anti-money laundering (AML) checks. The system uses cryptographic codes to authenticate electronic signatures appended to data messages by comparing the electronic signatures to hashes obtained from processing the data messages with a public key of the signing party.

Accountholders may submit transactions to the system through client devices, such as personal computers, laptops, smartphones, or other suitable types of devices. Responsive to user input, the client devices may generate data messages that include transaction amounts to be transferred, e.g., from a first to a second party. The transaction may involve a single asset or multiple assets, as is the case in foreign exchange transactions. Client devices may send data messages directly to the ledger administration server that controls the processing of the transaction. Client devices may also send the data messages to other servers, such as servers maintained by a commercial bank, and these servers may in turn relay the messages to the ledger administration server. The data messages may include electronic signatures appended by the client devices. These electronic signatures may be processed by the ledger administration server to verify that the data messages were sent from the client device and authorized by the respective accountholder. Responsive to verifying the electronic signatures, ledger administration server may employ a processor to identify the assets associated with the transaction, check available balances, and perform KYC validation. For example, the data message of a foreign exchange transaction, in which a first party buys U.S. dollars from a second party in exchange for Euros, may include transaction amounts in "U.S. dollars" and "Euros," respectively. In addition to determining the assets associated with the transaction, the ledger administration server may further employ the processor to identify a set of asset validation servers that validate the transaction. For example, each of the asset validation servers may be associated with the issuing authority of a specific asset involved in the transaction. Responsive to identifying the set of asset validation servers, the ledger administration server creates data messages based on the transaction data and sends it to each of the asset validation servers. As part of creating the data messages, the ledger administration server may append electronic signatures that can be used by each of the asset validation servers to verify that the data message has been sent by the ledger administration server.

An asset validation server associated with a given asset creates and stores redundant records of account balances included in the ledger for that given asset. The redundant records may be employed by the asset validation server to verify the balances of an accountholder independently from the ledger administration server. Responsive to receiving a data message corresponding to a transaction from the ledger administration server, the asset validation server may employ a processor to compare an account balance stored in its records with the transaction amount provided in the data message. If the account balance is greater than the transaction amount (i.e., if sufficient funds are available), the asset validation server may continue the processing of the transaction. Otherwise, the asset validation server may transmit a data message to the ledger administration server to indicate that the transaction should be rejected. The asset validation server may append an electronic signature to the data message that can be used by the ledger administration server to verify the authenticity of the data message.

If the asset validation server determines that the account balance is greater than or equal to the transaction amount for all accountholders included in the data message and for all assets it is responsible for, the asset validation server modifies the account balance stored at the asset validation server to reserve a balance equal to the transaction amount while the transaction continues to be processed. For example, the asset validation server may employ a separate data structure to update payment amounts associated with current or pending transactions. By reserving a portion of the available balance to obtain a "shadow balance," the asset validation server may reduce the likelihood of "double spending" or "replay." Such double spending or replay may occur in systems that process transactions faster than updating the available balance. In such systems, fraudulent transactions that individually meet but cumulatively exceed the available balance may be approved, because the system may not update the available balance between transactions. Asset validation servers help eliminate such double spending by maintaining a shadow balance while transactions continue to be processed.

The ledger administration server may also perform KYC checks in accordance with regulatory requirements. The ledger administration server may compile and store indications of such KYC authorizations in a look-up table, e.g., upon receiving such indication in a signed message from a KYC validator such as a commercial bank. In some aspects, KYC authorizations may be based on a chain of trust. For example, the ledger administration server may determine to accept a KYC authorization if the corresponding KYC validator indicates that it trusts the client and the ledger administration server (or asset validator associated with the asset involved in the transaction) in turn trusts the KYC validator. If the ledger administration server determines that any of the parties of a transaction is not associated with a valid KYC authorization, the ledger administration server may reject the transaction and provide a corresponding signed message to parties involved in the transaction.

For transactions that involve more than one asset, the ledger administration server receives a separate data message from the asset validation server of each asset involved in the transaction. Responsive to the receipt of the messages, the ledger administration server determines if one or more of the data messages includes an indication that the transaction should be rejected (e.g., due to insufficient funds). If at least one of the data messages includes such a rejection, ledger administration server rejects the transaction in its entirety and does not update the ledger account balances of any parties involved in the transaction. Conversely, if all of the data messages received from the asset validation servers include indications that the transaction should be approved, the ledger administration server updates the account balances maintained in its copy of the encrypted ledger.

The ledger administration server sends portions of the updated ledger to the asset validation servers in form of data messages. The data message sent to a specific asset validation server may only include balances for accounts held in the asset maintained by the specific asset validation server. For example, a validation server for U.S. dollars may only be sent the portion of the updated ledger that corresponds to accounts in U.S. dollars. The data messages may also include a list of completed transactions that have been incorporated into the updated ledger together with their respective unique identifiers and transaction amounts. Responsive to receiving the data message, the asset validation server may update its records based on the list of completed transactions, by modifying the account balances and records of reserved and pending payments. For example, an asset validation server may remove the transaction amount of a completed transaction from the shadow balance because that completed transaction is now reflected in the account balances included in the updated ledger. The asset validation server may further update status indications corresponding to transactions included in the list of transactions to denote that they have been completed and are no longer pending. The periodic transmission of account balances from the ledger administration server to the asset validation servers helps ensure that the distributed and redundant copies of the encrypted ledger, which are maintained separately at the ledger administration server and the asset validation server, remain consistent.

In summary, the systems and methods described herein address the problem of the significant time delay that arises in current exchange processes by providing a system architecture that can operate in substantially real-time. The systems and methods further address the problem of lack of identity verification of parties participating in current exchange processes by making identity checks that can satisfy KYC standards a component of the exchange process. The systems and methods further address the problem of disclosing information about account balances or transactions to third parties that do not need to know or otherwise access that information and thereby can reduce the cost of making transactions compared to current exchange processes.

In accordance with embodiments of the present disclosure, systems and methods are provided for modifying a data table having a plurality of accounts in substantially real-time. The systems and methods may receive a request to modify an account selected from the plurality of accounts, wherein the selected account comprises at least one asset, and determine an identity of a validator based on the received request and the at least one asset, wherein the validator is configured to validate the request in substantially real-time. The systems and methods may further modify the data table in substantially real-time if the validator validates the request.

In some implementations, the validator may be a first validator and the at least one asset may comprise a first and a second asset. The systems and methods may further include determining an identity of a second validator based on the received request, wherein the second validator validates the request in substantially real-time for the second asset.

In some implementations, the data table is modified to process a payment transaction or a deposit transaction, the at least one asset corresponds to a currency or a bond, and the validator is an issuing-authority of the currency or the bond. In some aspects, the issuing authority of the currency or the bond is a proxy for a central bank that issues the currency or a bond holder that issues the bond. In some implementations, the data table is modified to process a foreign exchange transaction, and the first asset corresponds to a first currency and the second asset corresponds to a second currency. Further, the first validator corresponds to a first issuing authority of the first currency, and the second validator correspond to a second issuing authority of the second currency. In other implementations, the received request comprises modifications to several accounts in the plurality of accounts, the validator is a first validator of a plurality of validators, and each of the plurality of validators is associated with a different asset. Further, the systems and methods include determining a plurality of identities for the plurality of validators based on the received request, wherein each of the plurality of validators validates the request in substantially real time.

In some implementations, the systems and methods may encrypt the plurality of accounts in the data table differently, so that a decryption process used by the first validator to access data of the first asset cannot be used to access data of the second asset.

In some implementations, the validator may determine whether to validate the request based on retrieving a published balance from the data table for the account and the at least one asset, and computing an available balance by reducing the published balance by shadow balances associated with pending and reserved payments. The systems and methods may further approve the request when the available balance is greater than or equal to a transaction amount of the request and reject the request when the available balance is less than the transaction amount of the request. In some implementations, the validator stores the shadow balances associated with pending and reserved payments and a redundant copy of the data table.

In some implementations, the validator determines whether to validate the request based on verifying whether a party associated with the account is authorized to perform the request.

In some implementations, the validator stores a redundant copy of the data table and the systems and methods further comprise sending modified portions of the data table to the validator, in response to modifying the data table. In some implementations, the redundant copy of the data table is encrypted to prevent the validator from accessing data that is of an asset different from the at least one asset.

BRIEF DESCRIPTION OF THE DRAWINGS

For purpose of explanation, several embodiments are set forth in the following figures.

DETAILED DESCRIPTION

In the following description, numerous details are set forth for purpose of explanation. However, one of ordinary skill in the art will realize that the embodiments described herein may be practiced without the use of these specific details. In other instances, well-known structures and devices are shown in block diagram form to not obscure the description with unnecessary detail.

Figure 1:
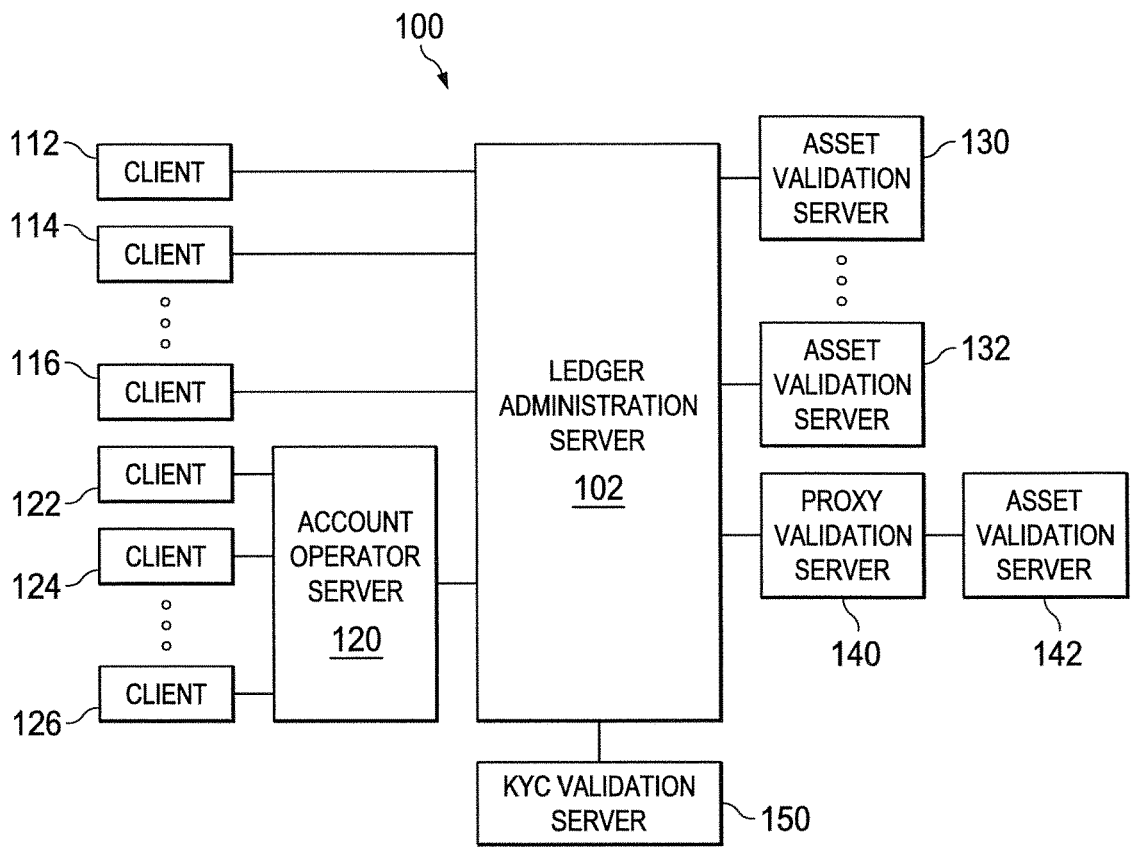
FIG. 1 is a block diagram of a distributed computer system that maintains and updates a distributed ledger.

FIG. 1 is an illustrative block diagram of a distributed computer system 100 that maintains and updates a distributed ledger. Computer system 100 includes ledger administration server 102, account operator server 120, asset validation servers 130, 132 and 142, proxy validation server 140, as well as KYC validation server 150. Ledger administration server 102 may be connected directly to clients 112-116 and may be connected to clients 122-126 through account operator server 120. In one example, the servers of computer system 100 may be standalone servers that are connected to one another through suitable network interfaces. In another example, computer system 100 may be implemented in a cloud-based computing environment. In that case, the servers of computer system 100 may each be implemented as a virtual machine that runs on one or more physical servers.

Clients 112-116 (generally client 112) and clients 122-126 (generally, client 122) may be employed by accountholders to access balances stored in the distributed ledger. Client 112 may be a personal computer, a laptop, a smartphone, or any other suitable computing device. Client 112 may include a processor and storage circuitry that stores software or other instructions that enable client 112 to exchange information (e.g., in the form of data messages) with account operator server 120 or ledger administration server 102. In one example, coupling client 122 to ledger administration server 102 through account operator server 120 may improve the scalability of system 100, because there may be many more clients than account operators.

Client 122 may store account balances for an accountholder associated with client 122. Alternatively or additionally, client 122 may also cause account operator server 120 to store the account balances. In one example, client 122 may store account information exclusively on account operator server 120 because client 122 may be vulnerable to theft (e.g., if client 122 is a mobile device) or may have a higher chance of being accessed illegally (e.g., through hacking) or tampered with (e.g., by infection with a software virus). Account operator server 120 may include a processors and storage circuitry to store the account information per accountholder and associate the account balance held in the distributed ledger with a conventional bank account (e.g., checking or savings accounts) maintained by the accountholder. For example, account operator server 120 may be a commercial bank server.

Ledger administration server 102 stores a master copy of the distributed ledger, which includes account balances for all accountholders in system 100. The account of each accountholder may include balances in multiple assets. Ledger administration server 102 may employ a processor to process transactions received in form of data messages from client 122 (possibly through account operator server 120). A transaction may involve a single asset or multiple assets (for example: in case of a foreign exchange transaction there will be two assets which are both currencies). Ledger administration server 102 may be coupled to asset validation servers 130 and 132 (generally, asset validation server 130), and the processing of a transaction by ledger administration server 102 may include the exchange of data messages between ledger administration server 102 and asset validation server 130.

Asset validation server 130 may include a processor and storage circuitry configured to store redundant copies of the distributed ledger. The storage of the redundant copies may improve the robustness, reliability, and security of the ledger, because in order to falsify or otherwise alter account balances stored by the encrypted distributed ledger, several of the redundant copies would need to be modified. As ledger administration server 102 and asset validation server 130 operate independently of one another, the task of compromising both servers is made more difficult.

To avoid that the distributed copies of the ledger cause account balances to be visible to the general marketplace, ledger administration server 102 and asset validation server 130 may further control visibility into the stored ledger by requiring a username and password, two-factor authentication, or other suitable forms of access control to obtain read or write access to the stored ledger. Further, while ledger administration server 102 may have full access to the distributed ledger, asset validation server 130 may only be granted access to those portions of the ledger that include account balances of the specific asset that is validated by asset validation server 130. For example, each of validation servers 130 and 132 may be associated with a asset (e.g., a fiat currency such as U.S. dollars or Euros, a crypto-currency such as bitcoins or ripples, or any other suitable type of asset such as bonds) and operated by the issuing authority of that asset (e.g., the central bank for that currency or the bond issuer of a bond). In such a scenario, asset validation server 130 may ensure that each unit of asset stored in the ledger of system 100 is backed by a "real-life" unit of asset held or controlled by a corresponding asset validator. Thus, the ledger may maintain customer confidence by being transparent to regulators that oversee the supply of a given asset without revealing confidential transactional information to the general marketplace.

It is possible that not all asset issuing authorities choose to provide asset validation servers that exchange data messages with ledger administration server 102 in substantially real-time. For such assets, a proxy may validate transactions by means of a proxy validation server 140. Proxy validation server 140 may be similar to asset validation servers 130 and 132; however, because proxy validation server 140 is not controlled by an asset issuing authority, proxy validation server 140 may not be able to ensure directly that each unit of asset stored in the ledger of system 100 is backed by a "real-life" unit of asset. To increase client confidence, proxy validation server 140 may further be connected to asset validation server 142, which is controlled by the respective asset-issuing authority. While asset validation server 142 may not store or control the distributed ledger, asset validation server 142 may be configured to verify that the combined ledger balances maintained by proxy validation server 140 are backed by corresponding "real-life" funds in an escrow account. Asset validation server 142 may control the amount of funds held in the escrow account in real-time and may continuously update the balance in the escrow account based on supply and demand for the asset. Proxy validation server 140 may be configured to associate the funds in the escrow account with account balances in the ledger in real-time, such that the combined operation of proxy validation server 140 and asset validation server 142 provides a similar one-to-one correspondence of balances in the ledger with "real-life" units of the respective asset.

Ledger administration server 102 and asset validation server 130 may be coupled to account operator server 120. Account operator server 120 may employ a processor and storage circuitry to link ledger account information with customer information on behalf of clients (e.g., clients 122-126). Ledger administration server 102 may further be coupled to KYC validation server 150. KYC validation server 150 may create and store electronic records that contain KYC information, such as tax identification numbers, checking or savings account numbers, passport or driver license numbers, or any other suitable form of personal identification. Ledger administration server 102 may access the KYC information stored by KYC validation server 150 by exchanging data messages. For example, ledger administration server 102 may send a message that includes indications of the parties of a transaction to KYC validation server 150 along with information that verifies the authenticity of the data messages (e.g., an electronic signature of ledger administration server 102). Responsive to receipt of the message, KYC validation server 150 may access customer records based on the account information included in the data message and may retrieve a KYC status. KYC validation server 150 may employ a processor to prepare a data message in response to the request received from ledger administration server 102 and may send it along with its electronic signature to ledger administration server 102. It is important to note that ledger administration server 102 and asset validation server 130 need not access KYC information in real-time or for each transaction. For example, ledger administration server 102 may store KYC information obtained for client 112 and use that information to perform KYC checks. Accordingly, the aforementioned data messages that are exchanged between KYC validation server 150 and ledger administration server 102 are not necessary for every transaction, which helps reduce the time needed to process a transaction.

Figure 2:
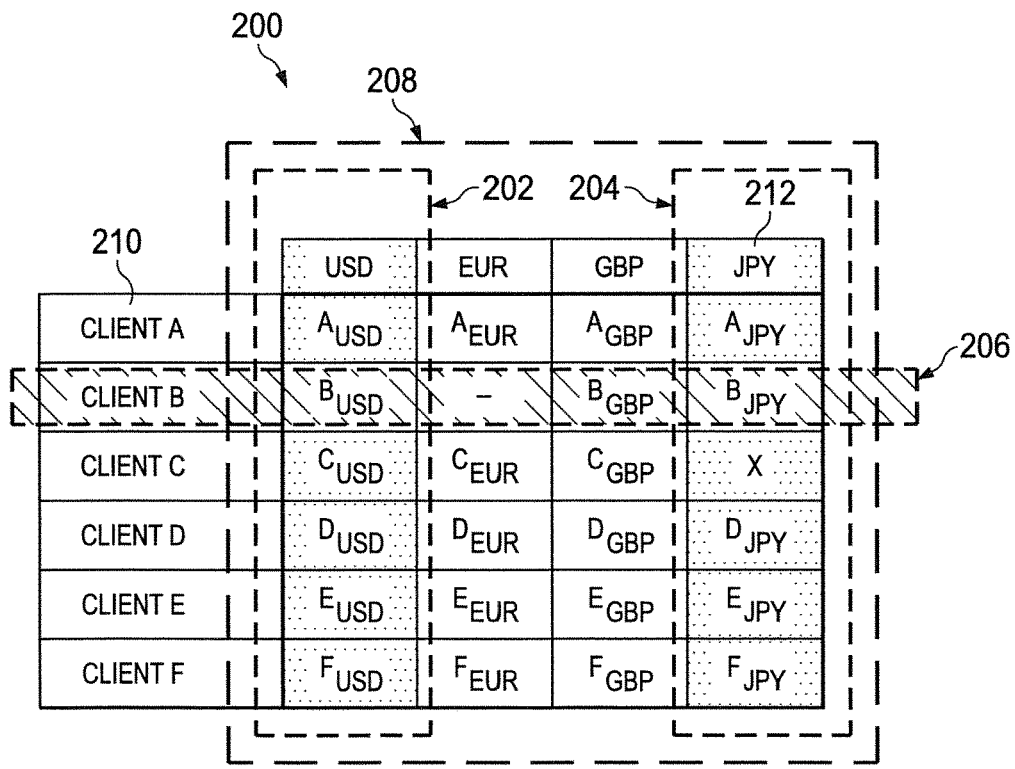
FIG. 2 is a diagram of the distributed ledger to illustrate visibility restrictions.

FIG. 2 shows a diagram of a distributed ledger 200 to illustrate visibility restrictions. For illustration, ledger 200 is shown as a table including rows 210 that contain ledger account balances per client, and columns 212 that correspond to different assets. For each client, ledger 200 contains at least one ledger account balance per asset. For example, an accountholder associated with client A has an account balance of $A_{USD}$ U.S. dollars, $A_{EUR}$ Euros, $A_{GBP}$ pounds, and $A_{JPY}$ Japanese Yen. Some clients may only maintain an account balance for a subset of the available assets. Records stored in ledger 200 may include an indication that specific assets are not used. For example, client B has a ledger account balance for U.S. dollars but no account balance for Euros. A reserved value may be stored in ledger 200 instead of associating a zero balance to indicate that client B generally does not perform transactions that involve the given asset. In some aspects, another reserved value may be used to indicate that a client is not permitted to perform transactions for a certain asset (e.g., due to regulatory or AML regulations). For example, client C may not be permitted to perform ledger transactions that involve Japanese Yen, which is denoted by an "X" in the corresponding entry of the ledger.

As discussed in relation to FIG. 1, system 100 provides swift processing of transactions that may be validated by regulators but opaque to the marketplace. The organization of ledger 200 illustrates the visibility restrictions that are enforced by system 100. For example, while ledger administration server 102 may have access to ledger 200 in its entirety, asset validators may have restricted access to ledger account balances that pertain to the specific asset validated by them. For example, an asset validator for U.S. dollars (e.g., asset validator 130) may only have access to ledger portion 202. Similarly, an asset validator for Japanese Yen (e.g., asset validator 132) may only have access to ledger portion 204. On the other hand, a client corresponding to a specific accountholder may have access to all ledger account balances associated with said client, such as ledger portion 206, which includes ledger account balances in U.S. dollars, pounds, and Japanese Yen.

In some aspects, client A may initiate a transaction with client D, such as a foreign exchange transaction. For example, client A may buy $A'_{USD}$ from client D in exchange for $D'_{JPY}$ Japanese Yen. This transaction involves two currencies, namely U.S. dollars and Japanese Yen. Ledger administration server 102 may receive separate data messages from clients A and D that request the transaction and may control the processing of the transaction. As such, ledger administration server 102 may have complete access to the ledger account balances of clients A and D. However, asset validation servers 130 and 132 may only have access to portions of the ledger. For example, asset validation server 130 may validate the U.S. dollar portion of the transaction and may therefore access ledger portion 202 which includes the ledger account balances $A_{USD}$ and $D_{USD}$. Similarly, asset validation server 132 may validate the Japanese Yen portion of the transaction and may therefore access ledger portion 204 which include the ledger account balances $A_{JPY}$ and $D_{JPY}$.

Figure 3:
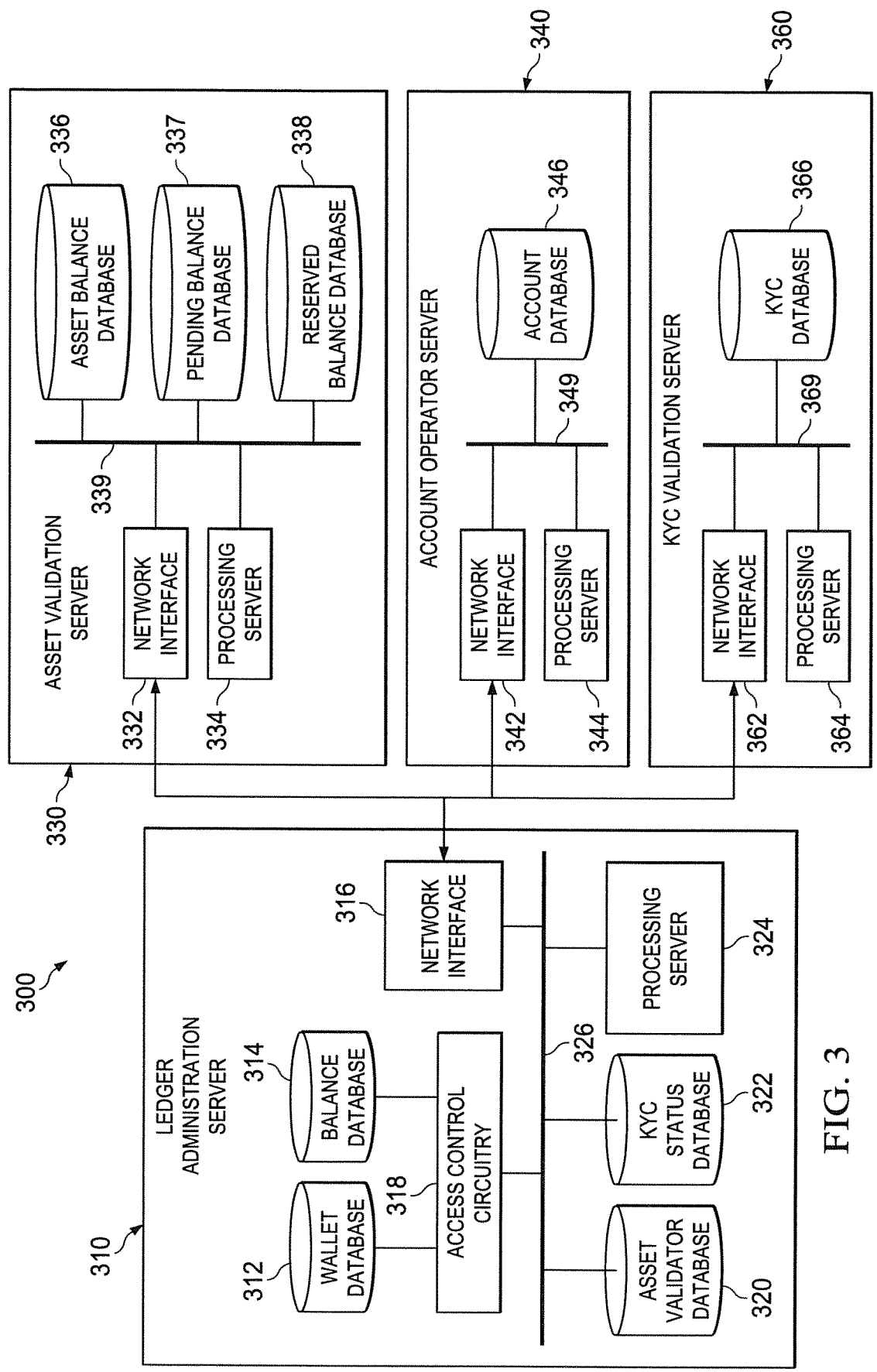
FIG. 3 is a block diagram of a ledger administration network.

FIG. 3 is a block diagram of a ledger administration network 300. Ledger administration network 300 includes ledger administration server 310, asset validation server 330, account operator server 340, and KYC validation server 360. Ledger administration server 310 and asset validation server 330 exchange data messages in order to maintain redundant copies of distributed ledger 200 subject to visibility constraints that allow the transparency required by regulators while making ledger account balances otherwise inaccessible to the general marketplace. Ledger administration server 310 controls the processing of a transaction and exchanges data messages with asset validation server 330 to verify the authenticity and accuracy of a transaction. Unless ledger administration server 310 receives a data message from asset validation server 330 that approves the transaction, ledger administration server 310 may not approve the transaction. In some aspects, this validation by asset validation server 330 provides that ledger account balances have a one-to-one correspondence with units of an asset controlled by the issuing authority of the asset associated with asset validation server 330. Similarly, ledger administration server 310 may send a data message to KYC validation server 360 to request validation of the KYC status of parties involved in the transaction. However, ledger administration network 300 may not require that KYC information be verified for each transaction. For example, KYC information may be stored at ledger administration 310 or asset validation server 330 and updated only at predetermined times (e.g., by exchanging data with KYC validation server 360). An update of KYC information may be requested by ledger administration server 310 or it may be pushed to ledger administration server 310 by KYC validation server 360.

Ledger administration server 310 includes processing server 324 and network interface 316, both of which are connected to bus 326. Network interface 316 may enable the exchange of data messages between ledger administration server 310, asset validation server 330, account operator server 340, and KYC validation server 360. Network interface 316 may also be used to exchange data messages directly with client 112. Processing server 324 may control the processing and data exchange performed by ledger administration server 310. Processing server 324 may also include authentication and encryption circuitry to validate signatures associated with data messages, and enforce the access constraints that ledger 200 is subject to. Bus 326 is further coupled to asset validator database 320, KYC status database 322, and access control circuitry 318. Access control circuitry 318 restricts access to wallet database 312 and balance database 314.

In some aspects, asset validator database 320 is coupled to bus 326 directly because ledger administration sever 310 makes accessible information stored in asset validator database 320 without access restrictions. In contrast, access control circuitry 318 may control access to information stored in wallet database 312 and balance database 314. In some aspects, asset validator database 320 stores a list of pointers, network addresses, or other suitable identification of asset validation servers (e.g., asset validation server 330) per asset.

As part of processing a transaction, ledger administration server 310 requests validation from at least one validation server for each asset involved in the transaction. However, multiple asset validation servers may be provided per asset. When multiple asset validation servers are available, asset validation server 330 may distribute the processing of transactions among the multiple asset validation servers. The multiple asset validation servers may also store a larger number of redundant copies of the distributed ledger. A larger number of ledger copies may further strengthen the resilience of ledger administration network 300 against malicious actors or fraudulent transactions.

Ledger administration server 310 further includes wallet database 312 and balance database 314, which are configured to store a copy of the ledger account balances maintained by ledger administration server 310. In some embodiments, wallet database 312 may store all assets held by a given client, together with other identifying information such as conventional bank account numbers as well as cryptographic codes (e.g., the client's public key). The ledger balances held by the client per asset may be stored in balance database 314, as will be discussed in relation to FIG. 4. In other embodiments, wallet database 312 and balance database 314 may be combined and store, per client, both the assets and the corresponding account balances in a common data structure. Ledger administration server 310 may restrict access to information stored in wallet database 312 and balance database 314 by using access control circuitry 318. Access control circuitry 318 may limit the access of a specific client to accounts held by the accountholder associated with the specific client. Access control circuitry 318 may provide these access restrictions by requiring a username and password or two-factor authentication prior to providing access to the database. Ledger administration server 310 may also have full access to wallet database 312 and balance database 314. However, access control circuitry 318 may ensure that ledger balances stored by wallet database 312 and balance database 314 are inaccessible to the general marketplace.

Ledger administration server 310 includes KYC status database 322. Ledger administration server may employ processing server 324 to store KYC status information (e.g., information identifying whether a client's account is valid or invalid) per client or per account. Ledger administration server 310 may utilize KYC status database 322 to obviate the need for exchanging KYC data with KYC validation server 360 every time a transaction is processed. Rather, ledger administration server 310 may update KYC status database 322 at predetermined times, by exchanging data messages with KYC validation server 360, but otherwise retrieve KYC status information from KYC status database 322 in substantially real-time as part of processing a transaction. In some embodiments, asset validation server 330 may store KYC status information in a similar way as ledger administration server 310. For example, asset validation server 330 may employ processing server 334 to store KYC status information per client or per account and may perform KYC status verification prior to approving transactions received from ledger administration server 330. Similar to ledger administration server 310, asset validation server 330 may employ the stored KYC status information (rather than exchange data messages with KYC validation server 360 for each transaction) in order to reduce the time it takes to process transactions.

Similar to ledger administration server 310, asset validation server 330 includes network interface 332 and processing server 334, both of which are connected to bus 339. Bus 339 is further coupled to asset balance database 336, pending balance database 337, and reserved balance database 338. Similar to ledger administration server 310, network interface 332 may be used to exchange data messages with ledger administration server 310 and account operator server 340. In some aspects, network interface 332 may be connected to additional asset validation servers. Ledger administration server 310 or asset validation server 330 may control the additional asset validation servers and distribute the load associated with transactions among the additional asset validation servers. The additional asset validation servers may further provide additional protection from unauthorized transactions because each of the additional asset validation servers may store redundant copies of the distributed ledger. Processing server 334 may be employed to authenticate data messages received from other servers in ledger administration network 300.

Asset balance database 336, pending balance database 337, and reserved balance database 338 may store a partial copy of ledger 200, which includes ledger account balances for the asset validated by asset validation server 330. For example, if asset validation server 330 validated all transactions in U.S. dollars, asset balance database 336, pending balance database 337, and reserved balance database 338 would store all ledger account balances in U.S. dollars. However, in this case, asset validation server 330 would not have access to ledger account balances in other assets, such as Euros or Japanese Yen. In some aspects, asset balance database 336 may store a copy of the ledger account balances for transactions that have previously been approved by asset validation server 330 and for which completion of the transaction was reported by ledger administration server 310 as part of a ledger update. In addition, reserved balance database 338 may store payment balances that have been approved by asset validation server 330 but not yet reported as complete by ledger administration server 310. For each account balance, only outgoing payments but not incoming payments may be recorded, and thus balances in pending balance database 338 may be non-negative. Similarly, pending balance database 337 may store balances for payments that have been validated by asset validation server 330 and signed by ledger administration server 310 but not yet included in the updated asset balance database.

Together, pending balance database 337 and reserved balance database 338 help prevent "double spending" or "replay." Using the information stored in pending balance database 337 and reserved balance database 338, asset validation server 330 may reduce a published ledger balance maintained in asset balance database 336 by the amounts stored in pending balance database 337 (e.g., the total sum of pending payments) and by the amount stored in reserved balance database 338 (e.g., the total sum of reserved payments). The resulting balance is known as "shadow balance" and accounts for transactions that have been processed by asset validation server 330 but not yet reported as "complete" by ledger administration server 310 in an updated ledger copy. As a result, attempts to "double spend" (e.g., by submitting multiple transactions in quick succession) are prevented, because asset validation server 330 updates the "shadow balance" in response to validating each transaction.

Similar to ledger administration server 310, KYC validation server 360 may include network interface 362 and processing server 364, both of which are connected to bus 369. KYC validation server 360 may use network interface 362 to exchange data messages with ledger administration server 310 and asset validation server 330. Processing server 344 may authenticate data messages received from or sent to other servers in ledger administration network 300. KYC validation server 360 further includes KYC database 366, which may store customer identifications. Information stored in KYC database 366 may be used to ensure compliance with KYC requirements. For example, at predetermined times, ledger administration server 310 may send a data message to KYC validation server 360 to verify a party's KYC status. KYC validation server 360 may store the relevant KYC status in KYC database 366. Responsive to a request from ledger administration server 310, KYC validation server 360 may search KYC database 366 based on a client identifier (e.g., a client's public key) and retrieve the client's current KYC status. KYC validation server 360 may then transmit a data message back to ledger administration server 310. It should be noted that KYC status need not be checked in real-time for every transaction. Rather, ledger administration server 310 and asset validation server 330 may access KYC information at predetermined times and use a locally stored status for processing transactions.

Similar to ledger administration server 310, account operator server 340 may include network interface 342 and processing server 344, both of which are connected to bus 349. Account operator server 340 may serve as an account processor for parties that prefer that information about ledger account balances be maintained on account operator server 340 rather than on their associated client (e.g., client 112). In this scenario, account operator server 340 essentially supplies the aforementioned processes in place of the client. Account operator server 340 may store information about the ledger account balances in account database 346. In some embodiments, account operator server 340 and KYC validation server 360 may be combined an implemented in a single server architecture.

In some embodiments, the redundant copies of the distributed ledger stored by ledger administration server 310 and asset validation server 330 may be stored in encrypted form. Ledger administration server 310 may control the visibility into the distributed encrypted ledger by employing an encryption process that encodes portions of the ledger differently, such that a decryption process that allows access to a first portion of the ledger cannot be used to access a second portion of the ledger. For example, ledger administration server 310 may encrypt balances corresponding to a first asset (e.g., U.S. dollars) such that only a decryption process used by a first asset validation server (e.g., a server at the Federal Reserve) can decrypt the balances. At the same time, ledger administration server 310 may encrypt balances corresponding to a second asset (e.g., Euros) such that the decryption process used by the first asset validation server (e.g., a server at the Federal Reserve) cannot decrypt the balances of the second asset, but only balances corresponding to the first asset. In some aspects, ledger administration server 310 and asset validation server 330 may exchange copies of the distributed encrypted ledger to ensure that the ledger is consistent across servers in ledger administration network 300. Although the asset validation servers may only be able to access portions of the distributed encrypted ledger, it can be desirable to exchange copies of the ledger in their entirety, e.g., for record keeping or improved robustness against failure of ledger administration server 310.

Figure 4:
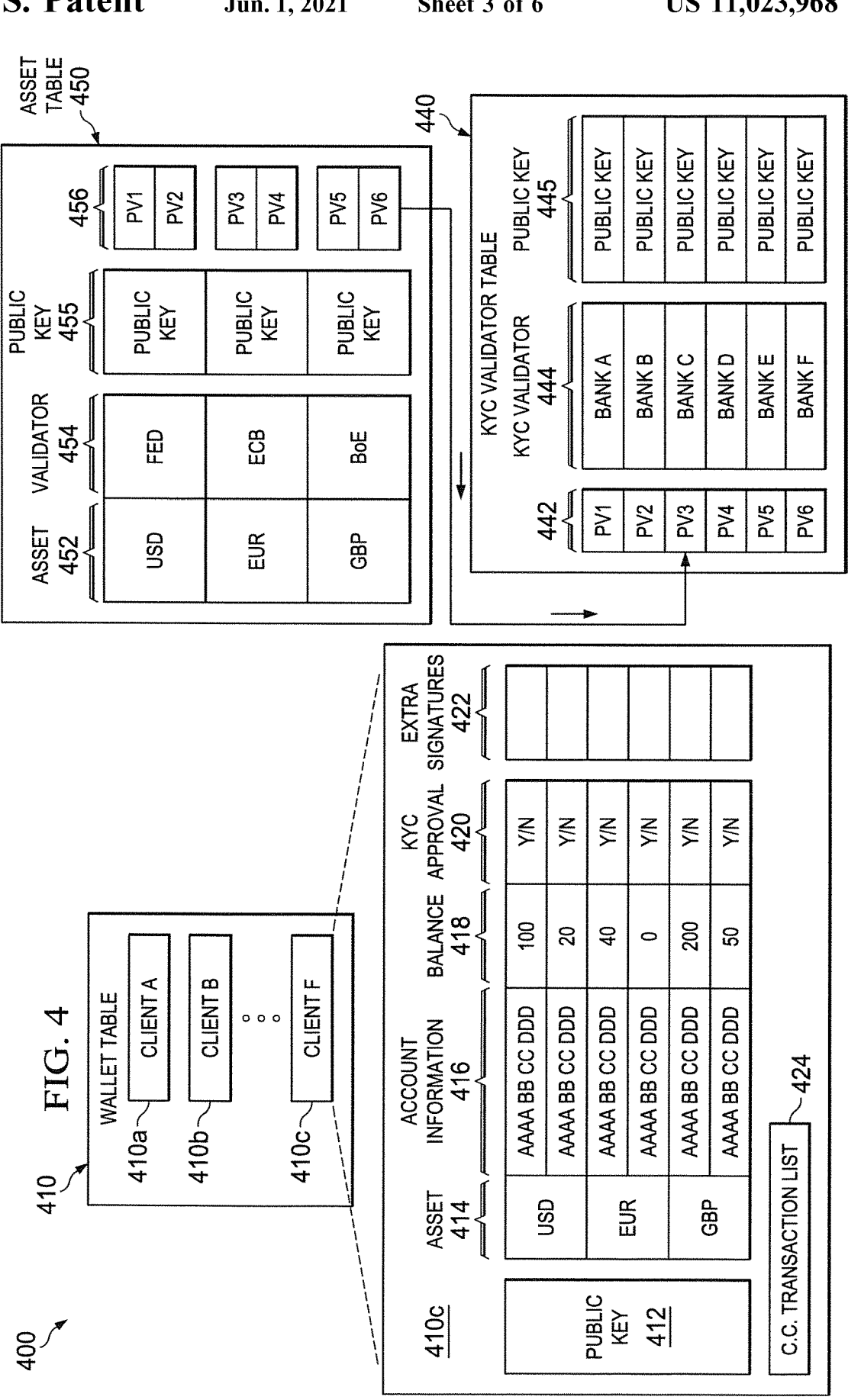
FIG. 4 depicts an exemplary data structure for storing ledger balances and account information in the distributed ledger.

FIG. 4 depicts an exemplary data structure 400 for storing ledger balances and account information in the distributed ledger. Data structure 400 includes wallet table 410, KYC validator table 440, and asset table 450. Wallet table 410 includes a list of data blocks, each of which stores ledger balances associated with a specific client, such as clients 410a-410c. For each client with an entry in wallet table 410, a data block of wallet table 410 (e.g., the data block of client 410c) may contain a public key 412, asset 414, account information 416, per-account balance 418, KYC approval status 420 and a copy of the cryptographically signed KYC approval message, and an extra signatures field 422, for a list of any additional signatures that may be required to process a transaction for account 416. Public key 412 may be used by servers across ledger administration network 300 to verify the authenticity of messages received from a client or server. Asset 414 may indicate one or more currencies or other assets for which the client maintains a ledger balance. Account information 416 may include conventional bank account information (e.g., corresponding to a checking or savings account, or a custody account for securities), and several accounts per asset may be possible. The currencies may include fiat currencies such as U.S. dollars or Euros, but also other types of currencies, such as cryptographic currencies (e.g., bitcoins or ripples), or any other suitable form of currency or asset. Data block 410c may store ledger balances 418 associated with each account 416. In some aspects, a separate balance table may be maintained in the ledger and may not be incorporated into data block 410c. In some embodiments, maintaining balance table separately from data block 410c may be beneficial because it provides more granular access restrictions, such as a higher level of privacy for the balance table compared to data block 410c. Data block 410c may further include per-account KYC status 420, which includes an indication of whether account 416 has been verified as KYC compliant by one of the approved KYC validators 444 listed in and also the ID of the validator for reference KYC validator table 440. For example, for a specific client associated with data block 410c, "Citibank" may be the KYC validator for one of the accounts in U.S. dollars, "Deutsche Bank" may be the KYC validator for one of the accounts in Euros, etc. Additionally, data block 410c may include C.C. transaction list 424, a field that stores the identity of extra parties that need to be informed (e.g., carbon copied) about a transaction. C.C. transaction list 424 may be stored per client, as shown in FIG. 4, in which case the parties that are notified about a transaction do not depend on which of the client's accounts is involved in a transaction. C.C. transaction list 424 may also be stored per account (e.g., as part of account information 416). In that case, different parties may be notified of transactions, dependent on which of the client's accounts is involved in a transaction. The entries in C.C. transaction list 424 may specifically identify the parties that are to be notified, and may include additional identifiers associated with a transaction.

Per-account KYC status 416 may be established by a KYC validator 444 listed in KYC validator table 440. Further, KYC validator table 440 may include a pointer 442 which may identify each KYC validator listed in KYC validator list 444. Each KYC validator 444 may be approved by an asset validator 454 in asset table 450 (e.g., a central bank) for a corresponding asset 452. Asset table 450 may store, for each asset validator 454, a public key 455 that may be employed by other parties to verify the authenticity of data messages received from asset validator 454. Further, asset table 450 includes a list of pointers 456 which are linked with pointers 442 such that every validator 454 may be linked with a group of approved KYC validators in KYC validator 444 for a asset 452. For example, for U.S. dollars, the Federal Reserve may serve as the asset validator, and Bank of America and Citibank may be among approved KYC agents. In some aspects, asset table 450 may be a global data structure that is not linked to a specific client or data block 410*c*. KYC validator table 440 may store a public key 445 for each KYC validator 444 that may be employed by other parties to verify the authenticity of data messages received from KYC validator 444.

Figure 5:
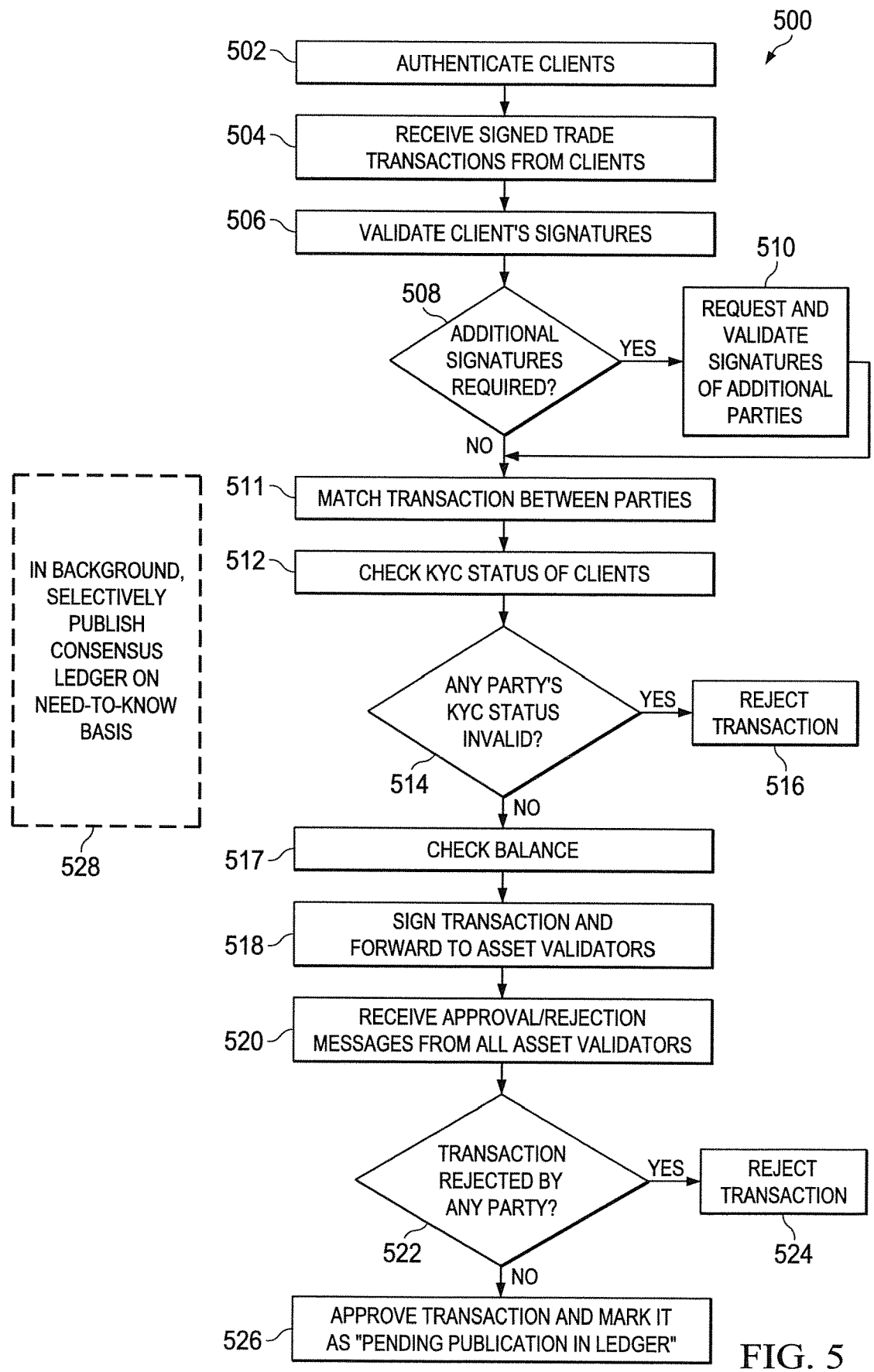
FIG. 5 is a flowchart of a process for updating a distributed ledger based on data messages received from validation servers that each store partial, redundant copies of the ledger.

FIG. 5 shows a flowchart of a process 500 for updating a distributed ledger based on data messages received from validation servers that each store partial, redundant copies of the ledger. Process 500 may, at step 502, receive input from the parties involved in a transaction (e.g., clients 112 or 122), while the remaining steps of process 500 may be performed by ledger administration network 300. As is discussed in relation to FIG. 3, the successful processing of a transaction may have ledger administration server 102 receive validations from asset validation servers (e.g., asset validation servers 330) as well as KYC verifications (e.g., from KYC validation server 360).

Process 500 may start at step 502 by receiving authentication requests from clients that are parties in a transaction. The access of the clients to ledger administration network 300 may be protected by a two-factor authentication mechanism or by providing a username and password. In some aspects, a username may specifically identify a client (e.g., client 112) and may be linked to the account of the client in the distributed ledger. The authentication procedure as well as the interface that clients use for submitting data messages with their transaction requests may be part of a specially designed Application Program Interface (API). Once clients gain access to ledger administration network 300, the API used by the clients to access ledger administration network 300 may collect from the clients and may store information about the requested transaction, such as the assets involved in the transactions, the ledger balances to be transferred or exchanged, as well as any other pertinent information needed for processing the transaction. In some aspects, such as in a foreign exchange transaction, where the transaction involves multiple clients, the clients may also input information about other parties (e.g., their respective public key or account information) that have previously agreed to be part of the transaction by other means (e.g., by voice, by email or through a conventional foreign exchange trading or processing platform). Each of the clients involved in a transaction may individually append their respective signatures to the data messages. The signatures identify the parties associated with a transaction request as well as transaction details. Clients may generate their respective signatures by hashing the data corresponding to the details of the transaction requested by said client, and then by encrypting the resulting hash using the client's private key to obtain an encrypted signature, as will be described in more detail in connection with FIG. 6.

At step 504, process 500 may receive a plurality of transaction requests by clients that have been authenticated by ledger administration server 310. The connection between ledger administration server 310 and the client device that accesses ledger administration server 310 through the API may be authenticated using conventional authentication protocols (e.g., the "Oauth" protocol). Process 500 may, at step 506, validate each party's signature that is associated with a transaction request. Process 500 may determine the validity of each client's signature by decrypting the signature to obtain a hash. The hash may then be compared with another hash obtained independently from the data message, as will be described in connection with FIG. 6.

If process 500 determines that the signatures are valid, process 500 may determine at step 508 whether the processing of the transaction requires any additional signatures. For example, KYC policies for a given client may require that other parties confirm transactions requested by a specific individual by adding extra signatures in extra signatures field 422 of data block 410*c* as described in connection with FIG. 4. If additional signatures are required, ledger administration server 310 may collect and validate the additional signatures at step 510, prior to continuing with process 500. Ledger administration server 310 may also check if any of the parties of a transaction have not yet provided their signatures. For example, a transaction may involve multiple clients, not all of which may have provided signed data messages at step 504. Accordingly, ledger administration server 310 may identify the type of transaction requested and send a request for any missing signatures. For instance, in a foreign exchange transaction, where the transaction involves multiple clients, the transaction information sent by a client using the API also contains information about the other parties that may take part in the transaction. In some embodiments, these parties have previously agreed to be part of the transaction by other means (e.g., by voice, by email or through a conventional foreign exchange trading or processing platform) and are known to the other participants in the transaction. At step 510, ledger administration server 310, may add the identities of the participants in C.C. transaction list 424 and their signature in extra signatures 422. These data tables may start to be filled when the data from the first client requesting the multiple party transaction is received and authenticated in step 504 by ledger administration server 310. Then, extra signatures table 422 is marked as incomplete, the identity of the parties listed in C.C. transaction list 424 is checked and matched to extra signatures table 422 one by one, as said parties log into the system and submit a request for the same transaction. When all parties have agreed to the transaction, extra signatures table 422 is marked as complete, and process 500 continues to the next step. Ledger administration 310 may implement a time-out mechanism using hardware or software control that sets a window of time for step 510, in which all the parties in a transaction agree to be part of it. In this way, process 500 may verify that all of the parties involved in a transaction have given authorization to be part of it, and have mutually acknowledged the other parties taking part in the same transaction.

After requesting all the needed signatures for the transaction, process 500 may, at step 511, match transaction between parties. For example, ledger administration server 310 may process a foreign exchange transaction by identifying a party that has submitted a transaction to sell a first asset in exchange for a second asset. Ledger administration server 310 may process the transaction of that party and match it with another transaction that has been received by another party seeking to sell the second asset in exchange for the first asset. In some cases, it may not be necessary to match transactions between parties, such as for payment transactions, or for transactions in which two or more parties have agreed beforehand to carry out a transaction.

Process 500 may, at step 512, check the KYC status for each client. In some aspects, such a KYC check may be mandated by law, and ledger administration server 310 may be configured to perform such a KYC check prior to approving any modification to the distributed ledger. In order to complete the KYC check, ledger administration server 310 may check that bank account details linked to each client account in the ledger have been verified and signed by a KYC validator. A list of approved KYC validators may be stored in KYC status database 322 (maintained by ledger administration server 310). A data structure similar to asset table 450 and KYC validator table 440 may be used, as discussed in connection with FIG. 4.

Process 500, at step 514, may determine whether the KYC status of all parties is valid. If any of the parties is associated with an invalid KYC status, process 500 may reject the transaction as a whole and may prevent any of the parties' ledger account balances from being updated. Otherwise, process 500 may determine at step 517 whether the ledger balance stored at ledger administration server 310 is greater than or equal to a payment amount of the transaction. If ledger administration server 310 determines that the ledger balance is sufficient, process 500 causes ledger administration server 310 to sign the transaction at step 518 and forward a data message with the transaction details to asset validators (e.g., asset validation server 330). Conversely, if ledger administration server 310 determines that the ledger balance is less than the payment amount, the transaction may be rejected. In some aspects, ledger administration server 310 may determine to which asset validation servers the transaction needs to be forwarded. For example, ledger administration server 310 may include a database that stores a list of asset validators (e.g., asset validator table 450). Ledger administration server 310 may determine the assets involved in the transaction, and forward data messages with transaction details to the asset validators obtained from asset table 450.

At step 520, process 500 may receive either an approval or a rejection from the asset validators associated with the transaction. The approval mechanism of a transaction by an asset validator may include the validation of the signatures of both the clients involved in the transaction as well as the validation of the signature associated with ledger administration server 310. After the signatures have been validated, the asset validation servers may compare the proposed transaction amount against the currently available balance, or "shadow balance" of each client. The shadow balance of a client for a given asset may correspond to the amount of the last published asset ledger balance for that client, minus a cumulative balance of all payments marked as "pending" or "reserved." Pending payments may correspond to fully signed, approved outgoing payments that have not been included in the latest ledger balance update received from ledger administration server 310. Reserved payments may correspond to outgoing payments that have been partially signed and not yet approved by ledger administration server 310. If this shadow balance is sufficient to cover the requested transaction, the amount required for such a transaction is added to the "reserved" amount, to prevent double-spending or "replay." Asset validation servers may further perform any additional non-public checks as required by regulation or law. Furthermore, asset validation servers may perform an additional layer of KYC validation. At this point, if all checks pass, the asset validation servers sign the transaction, and forward it to ledger administration server 310.

At step 522, process 500 may determine whether any of the asset validation servers has rejected the transaction or if any of the KYC checks has failed. If so, process 500 may determine, at step 524, that the transaction should be rejected. Conversely, process 500 may determine that the transaction is eligible for approval. Process 500 may then, at step 526, determine whether the transaction should be approved and marked for publication in the ledger.

Ledger administration server 310 may employ a consensus process that processes the fully approved messages received from the asset validation servers in order to include them in a new version of the ledger. Ledger administration server 310 may execute the consensus process periodically. In one example, the consensus process executed by ledger administration server 310 may determine to include those transactions if all of the messages received from the asset validation servers approve including those transactions. Otherwise, if the consensus process determines that at least one of the messages rejects those transactions, the proposed new ledger may be rejected in its entirety and the process repeated with an updated set of transactions. In another example, the consensus process executed by ledger administration server 310 may only require that at least a certain fraction of the data messages received from the asset validation servers approves the new ledger. For instance, the consensus process may determine that the new ledger for each asset should be approved if more than 80% of the messages received from the asset validation servers for that asset approve the transaction. In the candidate list of transactions to be included in the new ledger every transaction may have an associated "transaction ID" and may be listed alongside a hash of the signed transaction message. This hash may be used by the asset validation servers to quickly compare with transactions which it has approved in order to identify all the participants (e.g. clients and validators) in the transaction and the amounts and assets of the transaction. In one example, the process of agreeing a new ledger may be used to consolidate updates to the distributed ledger at each of the asset validators, e.g., in order to remove the "pending" or "reserved" status for completed transactions and to update asset balance database 336.

Between steps 518 and 520, process 500 may further perform anti-money laundering (AML) checks. For example, the asset validation servers (e.g., asset validation server 330) may employ processing server 334 to collect transaction histories and generate statistical data about account activity. Asset validation server 330 may further use a detection process to analyze the collected data and flag activity that matches suspicious patterns or other types of irregular account activities. Responsive to flagging an activity as suspicious, asset validation server 330 may generate a warning message. The warning message may cause the KYC status of the affected account to be changed to "not approved," thus blocking transactions relating to this account from being approved.

Process 500 may publish the ledger on a need-to-know basis. An important aspect of the present disclosure is the ability of ledger administration network 300 to maintain a distributed ledger without revealing sensitive information to the general marketplace, while providing regulators with the necessary transparency to validate transactions. In some aspects, the full ledger is stored by ledger administration server 310 and redundant partial copies are kept by the asset and KYC validators. The data contained in the redundant copies of the distributed ledger stored at ledger administration server 310, and at the asset validation servers, is kept synchronized, and the circuitry required for communication between asset validation servers and the ledger administration server may be designed such as to avoid latency between transaction publication in the ledger, and the process of cross-validation of the full ledger with the partial fragments kept by the validators. In some embodiments, even fully-redundant copies of the ledger may be stored by asset validation servers and the ledger administration server, thus reducing the risk of external interference or system wide malfunctions. Authentication techniques may provide that full access to the ledger balances is only available at the ledger administration server, while asset validation servers are only able to access their respective portions of the distributed ledger.

Figure 6:
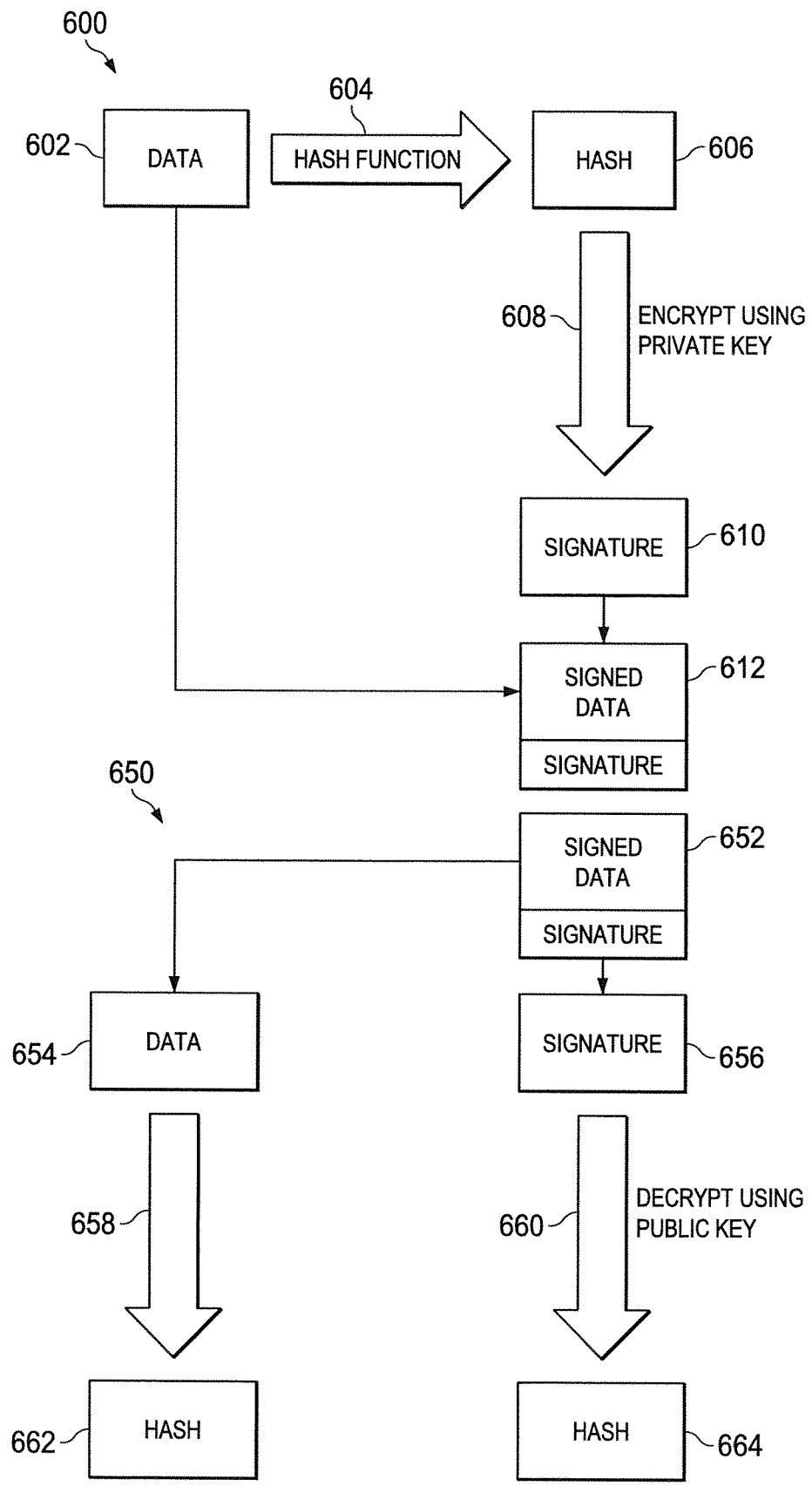
FIG. 6 is a schematic of an authentication method using public and private keys.

FIG. 6 illustrates two interrelated high level block diagrams 600 and 650 which jointly describe the process of authenticating a transaction. Diagram 600 details the procedure used to generate signed data by a party seeking the authentication, from a second authenticating party. Diagram 600 includes the original data 602 to be authenticated, a hash function 604, which processes the original data to produce a hash 606, an encrypted signature 610 generated with a private encryption key 608, and a new data structure 612 that results from appending the encrypted signature 610 to the original data 602.

The generation of the signed data, as described in diagram 600, may start with the hashing of the original data 602. The hashing is performed based on a hash function 604 that takes transaction details as input data, and outputs a unique string of data (hash) 606. The hash is then encrypted by conventional encryption methods (e.g., using RSA encryption) using a private key 608 which is only known to the party that authenticates the transaction. Using private key 608, a string of data is generated, corresponding to an encrypted signature 610. Signature 610 may then be appended at the end of the original data 602, or it may be included as a header. The resulting signed data 612 is sent to the party seeking to authenticate the origin of the data 612.

Diagram 650 describes the authentication procedure followed by an authenticating party of the signed data 612 generated by the process described in diagram 600. It includes the received signed data 652, which is composed of the original data 654 of the transaction, and the encrypted signature 656 generated in accordance with diagram 600. Diagram 650 also includes a public key 660, used for decryption of the signature 656, a hash function, 658, and two hashes 658 and 664, generated by the two alternate mechanisms described below.

Signed data 652 received by the authenticating party is separated into two fragments. The first data fragment 654 corresponds to the original data describing the transaction solicited by the party seeking authentication. The second fragment is an encrypted signature 656. Once isolated, the transaction data 654 is hashed by the hash function 658, which is identical to hash function 604, used in diagram 600 to generate the encrypted signature 610. This produces a hash 662. The encrypted signature 656 is decrypted with a public key 660 that is in the possession of the authenticating party, which according to conventional encryption techniques is linked with private key 608. The decryption of the signature using the public key produces a second hash, 664, which is compared with hash 662. The authentication is successful if 662 and 664 are identical. If this is not the case, the authentication process is marked as invalid and the requested transaction is rejected.

Figure 7:
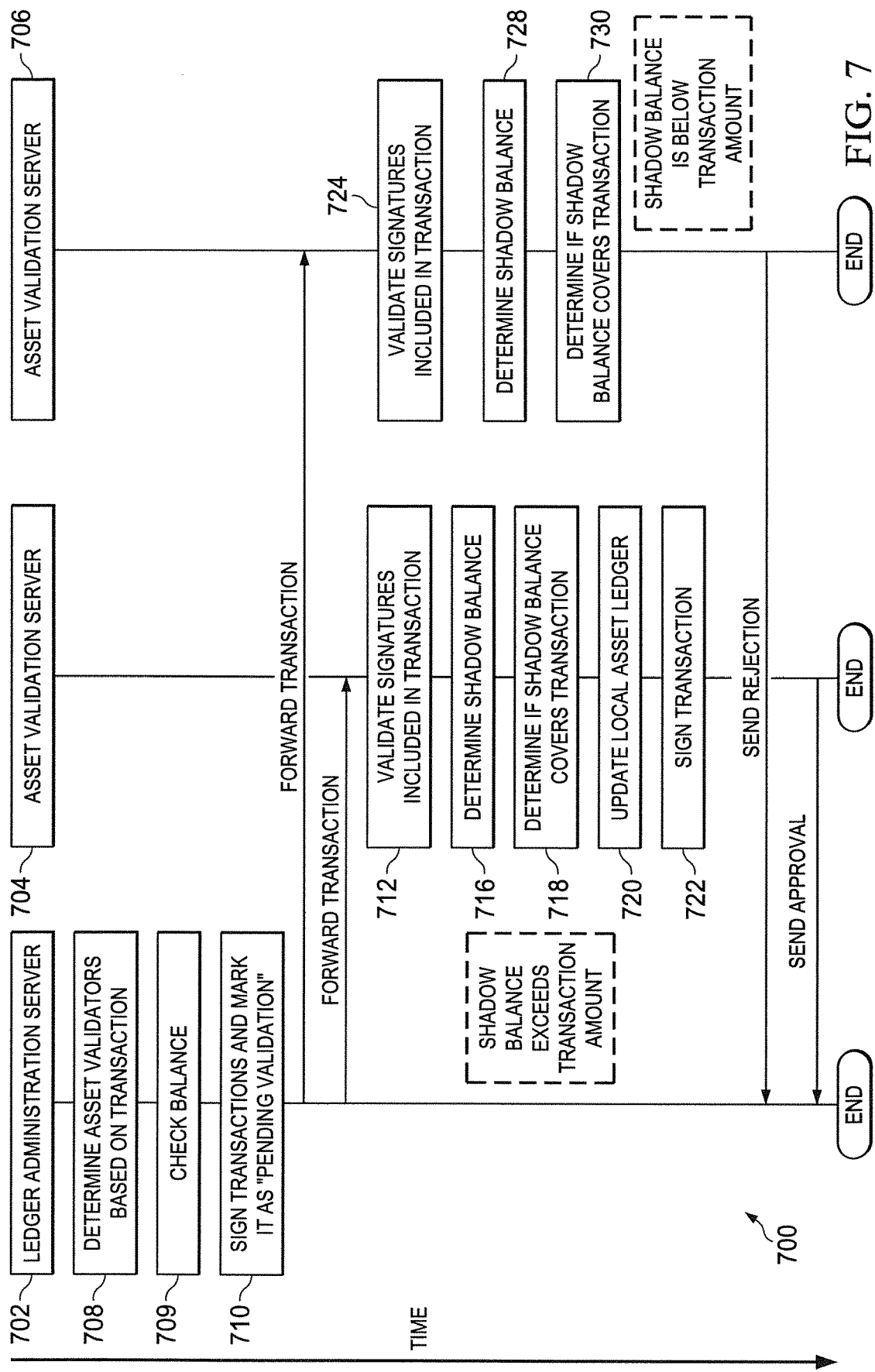
FIG. 7 is a flowchart for processing transactions by a ledger administration server 702 and two asset validation servers.

FIG. 7 is a flowchart 700 for processing transactions by ledger administration server 702 and two asset validation servers, asset validation servers 704 and 706. These validation servers may validate transactions for two different assets. For example, asset validation server 704 may validate transactions in U.S. dollars, and asset validation server 706 may validate transactions in Euros. Asset validation servers 704 and 706 may validate transactions by verifying that the transactions have been properly authenticated and by determining that the transaction amount is below an available balance in the account, reduced by pending or reserved payments. Flowchart 700 illustrates the process for a foreign exchange trade, for instance, of U.S. dollars and Euros. Time has been incorporated in FIG. 7 (represented by the arrow) along the vertical axis such as to illustrate the timing of data exchanges between servers in the ledger administration network. The steps depicted in flowchart 700 are executed in response to validating the signatures of the parties involved in a transaction, as discussed in relation to steps 508 and 510 in FIG. 5.

In flowchart 700, the servers of ledger administration network are represented by ledger administration server 702, asset validation server 704, and asset validation server 706, each of which may provide validating input to determine the processing and approval of the transaction. The exchange of messages between the different servers of process 700 may be implemented based on the network architecture illustrated in FIG. 3. In particular, the circuitry of the network interfaces 316, 332 and 342 may be used in combination with the two-stage authentication process 600 for the exchange of messages between ledger administration server 702 and asset validation servers 704 and 706. The circuitry of the network interfaces may work in conjunction with a machine-to-machine authentication protocol such as "Oauth" to prevent external interference with the communication between servers. This may be important given the possible large geographic spread of ledger administration server 702, asset validation server 704 and asset validation server 706.

After steps 508 and 510 of process 500 have been carried out, ledger administration server 702 determines the assets associated with the transaction at step 708. Once this list of assets has been identified, the list may be compared with asset table 450 in order to determine the identity of the asset validation server for each asset to be exchanged in the transaction. Similar to step 517 discussed in relation to FIG. 5, ledger administration server 702 may further determine whether the ledger balance stored at ledger administration server 702 is greater than or equal to a payment amount required by the transaction. If ledger administration server 702 determines that the balance is not sufficient, ledger administration server 702 may reject the transaction. Otherwise, ledger administration server 702 may sign the transaction and mark it as "pending validation" at step 710. The signature process 600 as described in FIG. 6 may be performed by ledger administration server 702. The data block 602 in this case, may contain as a header the signed data block 652 which may be sent by the API running in the device that the client used to request the transaction. This data block may be signed at step 710 by ledger administration server 702 as described by process 600 in FIG. 6 and the transaction may be marked as "pending validation."

Ledger administration server 702 may send the transaction information to the asset validators that may be determined internally at step 708 by ledger administration server 702 according to the mapping specified in currency table 450, and using the network architecture described in FIG. 3. Once the information is received by asset validation server 704 (e.g., the server validating U.S. dollar transactions) at step 712, the signatures of the clients and the signature of ledger administration server 702 are decrypted and verified. The decryption and validation of the signatures and the verification of the integrity of the data describing the transaction may follow process 650 as described in FIG. 6.

Asset validation server 704 then, at step 716, calculates the shadow balance for a given asset of the client. The shadow balance per client per asset is the balance of the last published asset balances in the ledger for a given client, denoted as the "latest published ledger balance", minus the amount for "pending transactions", which are payments that have been approved, validated and fully signed, but that have not been included in the last published distributed ledger, minus the amount for "reserved" transactions, which are transactions that have not been marked as completed but have been partially signed. Pending and reserved transactions may be moved to the local ledger balance once an updated ledger including the last transaction ID is published by ledger administration server 702.

At step 718, asset validation server 704 determines if the shadow balance calculated at step 716, is greater than the amount of the requested transaction. In that case, asset validation server 704 allows the transaction to continue.

At step 720, if the shadow balance is greater than or equal to the amount of the current transaction, asset validation server 704 updates the local asset ledger to reserve the transaction amount and update the shadow balance. The swift or immediate update of the shadow balance may be an important safeguard against "double spending" or "replay" attempts.

At step 722, after updating the local ledger of asset validation server 707 (which for this example is in USD), asset validation server 704 signs and sends a validation approval message to ledger administration server 702. The approval message may include an acknowledgment flag that marks the asset validation process as successful.

At 710 a second message is sent by ledger administration server 702 to asset validation server 706, which in this example, may be the server validating the Euro portion of the transaction. The steps 724-730, performed by asset validation server 706, may be similar to steps 712-718 performed by asset validation server 704. In this example, step 730 performed by asset validation server 706 may determine that the shadow balance of the client in Euros is less than the amount of the requested transaction. Responsive to this determination, asset validation server 706 may sign and send a rejection message to ledger administration server 702.

After receiving an approval message from asset validation server 704 and a rejection message from asset validation server 706, ledger administration server 702 determines that no consensus has been reached and rejects the transaction. In another scenario, in which all the asset validation servers have validated the transaction, the transaction is marked as "pending publication" as described at step 526 in connection with the discussion of FIG. 5.

Some embodiments of the present disclosure may be conveniently implemented using a conventional general purpose or a specialized digital computer or microprocessor programmed according to the teachings herein, as will be apparent to those skilled in the computer art. Appropriate software coding may be prepared by programmers based on the teachings herein, as will be apparent to those skilled in the software art. Some embodiments may also be implemented by the preparation of application-specific integrated circuits or by interconnecting an appropriate network of conventional component circuits, as will be readily apparent to those skilled in the art. Those of skill in the art would understand that information and signals may be represented using any of a variety of different technologies and techniques. For example, data, instructions, requests, information, signals, bits, symbols, and chips that may be referenced throughout the above description may be represented by voltages, currents, electromagnetic waves, magnetic fields or particles, optical fields or particles, or any combination thereof. Some embodiments may be implemented using existing parallel, distributed computer processing and distributed data storage frameworks (e.g., Hadoop).

Some embodiments include a computer program product comprising a computer readable medium (media) having instructions stored thereon/in and, when executed (e.g., by a processor), perform methods, techniques, or embodiments described herein, the computer readable medium comprising sets of instructions for performing various steps of the methods, techniques, or embodiments described herein. The computer readable medium may comprise a storage medium having instructions stored thereon/in which may be used to control, or cause, a computer to perform any of the processes of an embodiment. The storage medium may include, without limitation, any type of disk including floppy disks, mini disks (MDs), optical disks, DVDs, CD-ROMs, micro-drives, and magneto-optical disks, ROMs, RAMs, EPROMs, EEPROMs, DRAMs, VRAMs, flash memory devices (including flash cards), magnetic or optical cards, nanosystems (including molecular memory ICs), RAID devices, remote data storage/archive/warehousing, or any other type of media or device suitable for storing instructions and/or data thereon/in. Additionally, the storage medium may be a hybrid system that stored data across different types of media, such as flash media and disc media. Optionally, the different media may be organized into a hybrid storage aggregate. In some embodiments different media types may be prioritized over other media types, such as the flash media may be prioritized to store data or supply data ahead of hard disk storage media or different workloads may be supported by different media types, optionally based on characteristics of the respective workloads. Additionally, the system may be organized into modules and supported on blades configured to carry out the storage operations described herein.

Stored on any one of the computer readable medium (media), some embodiments include software instructions for controlling both the hardware of the general purpose or specialized computer or microprocessor, and for enabling the computer or microprocessor to interact with a human user and/or other mechanism using the results of an embodiment. Such software may include without limitation device drivers, operating systems, and user applications. Ultimately, such computer readable media further includes software instructions for performing embodiments described herein. Included in the programming (software) of the general-purpose/specialized computer or microprocessor are software modules for implementing some embodiments.

Those of skill would further appreciate that the various illustrative logical blocks, modules, circuits, techniques, or method steps of embodiments described herein may be implemented as electronic hardware, computer software, or combinations of both. To illustrate this interchangeability of hardware and software, various illustrative components, blocks, modules, circuits, and steps have been described herein generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the embodiments described herein.

The various illustrative logical blocks, modules, and circuits described in connection with the embodiments disclosed herein may be implemented or performed with a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The techniques or steps of a method described in connection with the embodiments disclosed herein may be embodied directly in hardware, in software executed by a processor, or in a combination of the two. In some embodiments, any software module, software layer, or thread described herein may comprise an engine comprising firmware or software and hardware configured to perform embodiments described herein. In general, functions of a software module or software layer described herein may be embodied directly in hardware, or embodied as software executed by a processor, or embodied as a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read data from, and write data to, the storage medium. In the alternative, the storage medium may be integral to the processor. The processor and the storage medium may reside in an ASIC. The ASIC may reside in a user device. In the alternative, the processor and the storage medium may reside as discrete components in a user device.

What is claimed is:

1. A method comprising:
    receiving, at a ledger administration server, a request to modify an account selected from a plurality of accounts stored in a data table, wherein the selected account is associated with a first asset corresponding to a first currency or a first bond and a second asset corresponding to a second currency or a second bond;
    determining, at the ledger administration server, a know-your-customer (KYC) status of the selected account by receiving from a KYC validation server a verification of bank account information associated with the selected account;
    determining, at the ledger administration server, an identity of first and second asset validation servers based on the received request and the first and second assets, wherein the first asset validation server is configured to validate the request in substantially real-time for the first asset and the second asset validation server is configured to validate the request in substantially real-time for the second asset, wherein the first asset validation server comprises at least one computing device that corresponds to a first issuing authority of the first currency or the first bond and the second asset validation server comprises at least one computing device that corresponds to a second issuing authority of the second currency or the second bond, wherein each issuing authority of each currency or each bond is a proxy for a central bank that issues the currency or a bond issuer that issues the bond;
    encrypting, at the ledger administration server, first data of the first asset and second data of the second asset differently in the data table, such that a first decryption process used by the first asset validation server to access the first data of the first asset cannot be used to access the second data of the second asset and a second decryption process used by the second asset validation server to access the second data of the second asset cannot be used to access the first data of the first asset;
    modifying, at the ledger administration server, the data table in substantially real-time in response to the first and second asset validation servers validating the request, wherein the first asset validation server is configured to store a first redundant copy of the data table and the second asset validation server is configured to store a second redundant copy of the data table; and
    sending, by the ledger administration server, at least one modified portion of the data table to the first and second asset validation servers, wherein each asset validation server is configured to update the corresponding redundant copy of the data table with the at least one modified portion of the data table, wherein the at least one modified portion of the data table sent to the first and second asset validation servers comprises the differently encrypted first data of the first asset and second data of the second asset.

2. The method of claim 1, wherein the data table is modified to process a payment transaction or a deposit transaction.

3. The method of claim 1, wherein:
    the data table is modified to process a foreign exchange transaction;
    the first asset corresponds to a first currency and the second asset corresponds to a second currency; and
    the first issuing authority is an issuing authority of the first currency, and the second issuing authority is an issuing authority of the second currency.

4. The method of claim 1, wherein each asset validation server is configured to determine whether to validate the request based on:
    retrieving a published balance from the data table for the selected account and the corresponding asset;
    computing an available balance by reducing the published balance by shadow balances associated with pending and reserved payments;
    approving the request when the available balance is greater than or equal to a transaction amount of the request; and
    rejecting the request when the available balance is less than the transaction amount of the request.

5. The method of claim 4, wherein each asset validation server is configured to store the shadow balances associated with pending and reserved payments and the corresponding redundant copy of the data table.

6. The method of claim 1, wherein each asset validation server is configured to determine whether to validate the request based on:
verifying whether a party associated with the selected account is authorized to perform the request.

7. The method of claim 1, wherein each redundant copy of the data table is encrypted to prevent the corresponding asset validation server from accessing data for an asset different from the corresponding asset.

8. The method of claim 1, wherein:
the first asset validation server is restricted from accessing second portions of the data table that include account balances of the second asset, and
the second asset validation server is restricted from accessing first portions of the data table that include account balances of the first asset.

9. The method of claim 1, further comprising:
before receiving the request to modify the account, receiving one or more authentication requests from one or more clients that are parties to the modification of the account.

10. The method of claim 1, wherein each of the first asset validation server and the second asset validation server is associated with a different encryption key for verification of data messages received from the first asset validation server or the second asset validation server.

11. A system comprising:
a memory configured to store a data table having a plurality of accounts; and
at least one processor configured to:
receive a request to modify an account selected from the plurality of accounts, wherein the selected account is associated with a first asset corresponding to a first currency or a first bond and a second asset corresponding to a second currency or a second bond;
determine a know-your-customer (KYC) status of the selected account by receiving from a KYC validation server a verification of bank account information associated with the selected account;
determine an identity of first and second asset validation servers based on the received request and the first and second assets, wherein the first asset validation server is configured to validate the request in substantially real-time for the first asset and the second asset validation server is configured to validate the request in substantially real-time for the second asset, wherein the first asset validation server comprises at least one computing device that corresponds to a first issuing authority of the first currency or the first bond and the second asset validation server comprises at least one computing device that corresponds to a second issuing authority of the second currency or the second bond, wherein each issuing authority of each currency or each bond is a proxy for a central bank that issues the currency or a bond issuer that issues the bond;
encrypt first data of the first asset and second data of the second asset differently in the data table, such that a first decryption process used by the first asset validation server to access the first data of the first asset cannot be used to access the second data of the second asset and a second decryption process used by the second asset validation server to access the second data of the second asset cannot be used to access the first data of the first asset;
modify the data table in substantially real-time in response to the first and second asset validation servers validating the request, wherein the first asset validation server is configured to store a first redundant copy of the data table and the second asset validation server is configured to store a second redundant copy of the data table; and
send at least one modified portion of the data table to the first and second asset validation servers, wherein each asset validation server is configured to update the corresponding redundant copy of the data table with the at least one modified portion of the data table, wherein the at least one modified portion of the data table sent to the first and second asset validation servers comprises the differently encrypted first data of the first asset and second data of the second asset.

12. The system of claim 11, wherein the data table is modified to process a payment transaction or a deposit transaction.

13. The system of claim 11, wherein:
the data table is modified to process a foreign exchange transaction;
the first asset corresponds to a first currency and the second asset corresponds to a second currency; and
the first issuing authority is an issuing authority of the first currency, and the second issuing authority is an issuing authority of the second currency.

14. The system of claim 11, wherein, to determine whether to validate the request, each asset validation server is configured to:
retrieve a published balance from the data table for the selected account and the corresponding asset;
compute an available balance by reducing the published balance by shadow balances associated with pending and reserved payments;
approve the request when the available balance is greater than or equal to a transaction amount of the request; and
reject the request when the available balance is less than the transaction amount of the request.

15. The system of claim 14, wherein each asset validation server is configured to store the shadow balances associated with pending and reserved payments and the corresponding redundant copy of the data table.

16. The system of claim 11, wherein, to determine whether to validate the request, each asset validation server is configured to:
verify whether a party associated with the selected account is authorized to perform the request.

17. The system of claim 11, wherein each redundant copy of the data table is encrypted to prevent the corresponding asset validation server from accessing data that is of an asset different from the corresponding asset.

18. The system of claim 11, wherein:
the first asset validation server is restricted from accessing second portions of the data table that include account balances of the second asset, and
the second asset validation server is restricted from accessing first portions of the data table that include account balances of the first asset.

19. The system of claim 11, wherein the at least one processor is further configured to:
before receiving the request to modify the account, receive one or more authentication requests from one or more clients that are parties to the modification of the account.

20. The system of claim 11, wherein each of the first asset validation server and the second asset validation server is associated with a different encryption key for verification of data messages received from the first asset validation server or the second asset validation server.

\* \* \* \* \*